United States Patent [19]

Payne

[11] Patent Number: 5,309,082
[45] Date of Patent: May 3, 1994

[54] HYBRID LINEAR-SWITCHING POWER SUPPLY

[75] Inventor: Dean A. Payne, Seattle, Wash.

[73] Assignee: Hewlett-Packard Company, Palo Alto, Calif.

[21] Appl. No.: 911,858

[22] Filed: Jul. 10, 1992

[51] Int. Cl.$^5$ .............................................. G05F 1/563
[52] U.S. Cl. .................... 323/270; 323/273; 323/282
[58] Field of Search ............... 323/273, 282, 266, 280, 323/281, 290, 268, 270, 223, 224, 226, 352, 222; 363/124

[56] References Cited

U.S. PATENT DOCUMENTS

| | | | |
|---|---|---|---|
| 4,292,581 | 9/1981 | Tan | 323/283 |
| 4,502,152 | 2/1985 | Sinclair | 323/268 X |
| 4,679,130 | 7/1987 | Moscovici | 323/266 |
| 4,881,023 | 11/1989 | Perusse et al. | 323/273 |
| 4,893,228 | 1/1990 | Orrick et al. | 363/89 |
| 4,972,136 | 11/1990 | Banura | 323/275 |
| 5,083,078 | 1/1992 | Kubler et al. | 323/268 |
| 5,216,353 | 6/1993 | Mori | 323/266 |

OTHER PUBLICATIONS

Meyer, Fred, "Switched-Mode Power Supplies," The ARRL Handbook for Radio Amateurs, Published by the American Radio Relay League, 1991, 68th Ed., pp. 6-25-6-35.

Primary Examiner—Steven L. Stephan
Assistant Examiner—Adolf Berhane

[57] ABSTRACT

A hybrid regulator incorporates both linear and switching-type regulator circuits. While such a combination may at first be thought undesirable as simply compounding the flaws of one design with the flaws of the other, in fact the present design is well suited for many applications. In the preferred embodiment, the linear and switching circuits are cascaded. The switching circuit runs in open-loop fashion—without adaptive control. However, a feedback signal is derived from the output of the switching circuit and is used to control the linear regulator, effecting net control of the entire circuit. In this manner, a simple, low cost power supply is provided that provides the excellent regulation and simple over-current protection characteristic of a linear supply, together with the boost capabilities of switching topologies.

11 Claims, 1 Drawing Sheet

HYBRID LINEAR-SWITCHING POWER SUPPLY

FIELD OF THE INVENTION

The present invention relates generally to electronic power supplies, and more particularly relates to a combination of a linear, controlled current regulator with a switching regulator to provide a hybrid linear-switching power supply.

BACKGROUND AND SUMMARY OF THE INVENTION

Prior art power supplies typically fall into one of two classes. The first, "linear" power supplies, regulate an output parameter (current or voltage) by linearly changing a variable impedance in response to load conditions so as to maintain a fixed output. The second, "switched" power supplies, regulate an output parameter by controllably storing energy in a reactive component (typically an inductor) and discharging this energy to the load.

Linear regulators offer a number of advantages, one of which is good regulation. However, they also suffer from several drawbacks, the primary one of which is inefficiency. Power that is not consumed by the load is dissipated as heat. Linear regulators often have efficiencies below fifty percent.

Switching regulators also offer a number of advantages, a primary one of which is high efficiency—often above 85%. Also, switching regulators can provide "boost." That is, the DC output voltage may be greater than the DC input voltage. However, switching regulators also have a number of drawbacks. One is that they cannot provide precision (i.e. <0.1%) regulation. Another is that the control circuitry used to dynamically control the switching characteristics (i.e. duty cycle) of a switching regulator to effect regulation in response to changing load conditions is generally complex, especially at high switching frequencies. Yet another is that the output signal usually includes some output ripple due to the switching operation. Finally, over-current protection is somewhat difficult to implement in many topologies.

In accordance with the present invention, a hybrid regulator is provided that incorporates both linear and switching-type circuits. While such a combination may at first be thought undesirable as simply compounding the flaws of one design with the flaws of the other, in fact the present design is well suited for certain applications.

In the preferred embodiment, the linear and switching circuits are cascaded. The switching circuit runs in open-loop fashion—without adaptive control. However, a feedback signal is derived from the output of the switching circuit and is used to control the linear regulator, effecting net control of the entire circuit. In this manner, a simple, low cost power supply is provided that provides simple over-current protection, characteristic of a linear supply, together with the boost capabilities of some switching topologies.

The foregoing and additional features and advantages of the present invention will be more readily apparent from the following detailed description, which proceeds with reference to the accompanying drawings.

DETAILED DESCRIPTION OF THE INVENTION

Figure 1:
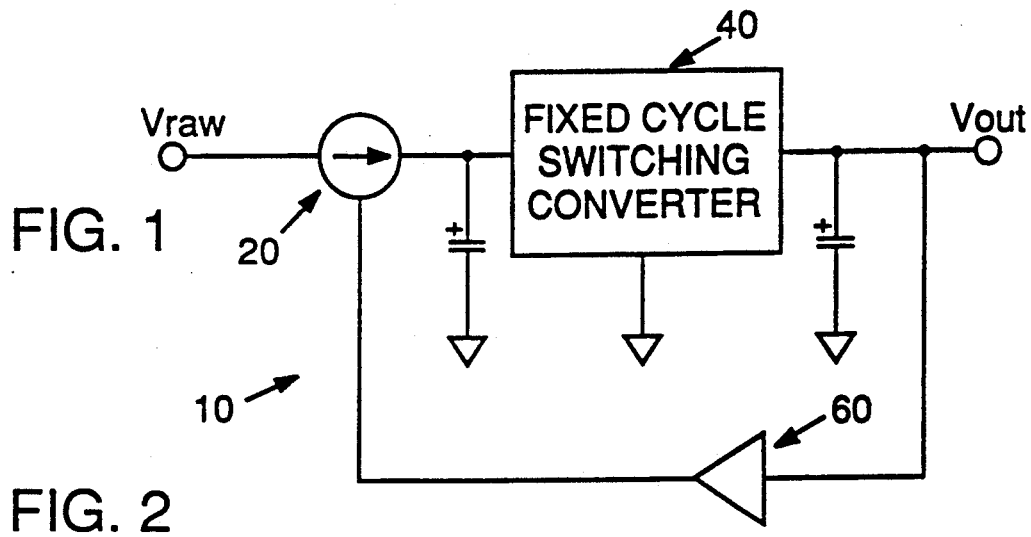
FIG. 1 is a block diagram of a hybrid linear-switching power converter according to one embodiment of the present invention.
Figure 2:
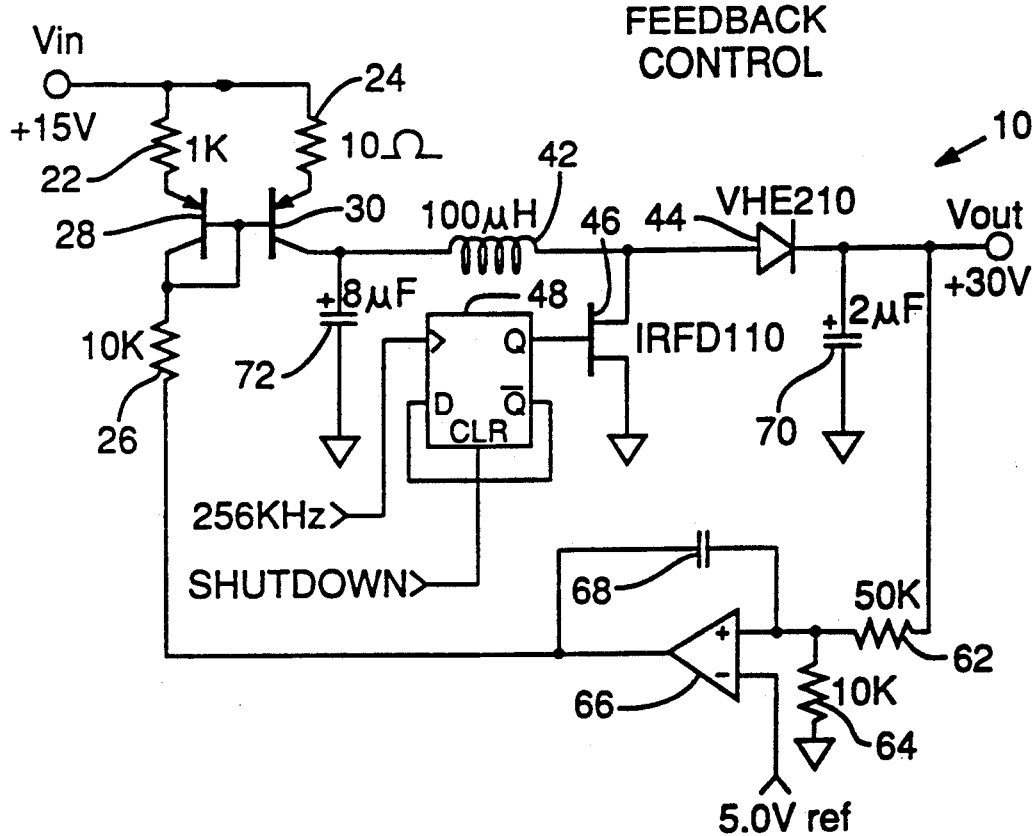
FIG. 2 is an electronic schematic more particularly illustrating the FIG. 1 embodiment.

Referring to FIGS. 1-2, a hybrid linear-switching power converter 10 according to the present invention includes a linear regulator 20, a switching regulator 40 and a feedback system 60.

An unregulated DC input signal (Vraw) is fed into the linear regulator 20. Regulator 20 is here a simple transistor current regulator. In other embodiments the regulator can be an adjustable voltage regulator (e.g., a typical LM317 regulator element), or almost any linear control element. In the illustrated circuit 10, the input signal is 15 volts unregulated DC.

The output from the linear regulator 20 passes to the switching regulator 40. The illustrated switching regulator is completely open-loop in itself. Because there is no duty cycle control or any current mode control, its implementation is simplified. The illustrated switching regulator has a "boost" topology and provides a regulated output of 30 volts.

Finally, a feedback signal is fed from the output of the switching regulator 40 to the controlled current source 20 to provide output control.

Examining the system components now in greater detail, the linear regulator 20 is comprised of two transistors 28 and 30, and three resistors 22, 24 and 26, which together form a voltage controlled linear current source. The transistors employed in the present embodiment are types TIP107 and 2N3906, respectively. The 1KΩ resistor 22 and the 10KΩ resistor 26 are set to provide control voltage scaling from the feedback loop 60. The 10Ω resistor 24 acts as a current limiting element and also establishes a current ratio between transistors 28 and 30.

An 8 μF capacitor 72 filters the linear regulator output signal.

The switching regulator 40 is comprised of a 100 μH inductor 42, a diode 44, a switching transistor 46, and a drive circuit 48. The drive circuit is simply a 74HC74 D-type flip flop, driven directly by a 256 KHz clock signal. This high switching rate permits smaller inductors (which store less energy per cycle), and simpler filter elements (for ripple control), to be used. It will be appreciated that other clock signal values may of course be employed.

In the illustrated embodiment, the flip-flop 48 is active low. The flip-flop conditions the incoming clock signal to the switching transistor 46, which may be an International Rectifier type IRFD110 FET transistor. The flip-flop's clear line provides for an optional shutdown circuit feature.

An FET switching transistor is preferred due to its fixed, low ON resistance and its minimal drive requirements. Bipolar transistors, in contrast, tend to require a gate drive current that can exceed the capacity of many logic devices and are therefor less desirable, but may nonetheless be used.

The illustrated switching regulator 40 operates with a fixed 50% duty cycle, thereby simplifying the controller design. A fixed duty cycle clock can directly drive the switching transistor, replacing any pulse width modulator or other controller needed to regulate standard switched mode power supplies. This is a most useful feature at high switching frequencies.

In the initial half of the conversion cycle, with the switching transistor 46 turned on, the output terminal of inductor 42 is shorted to ground, causing the inductor to charge up from the current source 20. Energy stored in the 8 µF capacitor 72 is injected into the magnetic field of the inductor. In the second half of the conversion cycle, with the transistor turned off, the current in the inductor is discharged through the diode 44 into a 2 µF output capacitor 70.

After the magnetic field the inductor dissipates, the diode 44 prevents any energy from returning from the output capacitor. The diode 44 has no special requirements except that it should be capable of handling the maximum current delivered by the inductive element 42. Typically a Schottkey diode with a low forward drop is used. A Fast Recovery diode would be preferred in high frequency implementations.

Most switching converters draw a pulsed input current from the raw supply. This pulsing introduces ripple which can be detrimental to other loads attached to the raw supply. In the illustrated power supply 10, the controlled current source 20 minimizes this ripple by regulating its input current.

The feedback control circuit 60 provides the voltage control signal that is fed back to control the linear regulator 20. The feedback signal is derived from the output of the switching regulator 40 and is first ratioed by voltage divider resistors 62, 64 to one-sixth of its original value. This signal is provided to the non-inverting input of an op-amp 66. The inverting input is provided a reference voltage—here five volts. A feedback capacitor 68 connects the non-inverting input to the op-amp output and thereby provides a loop gain that diminishes with frequency. The output of the feedback loop is connected to resistor 26 of the linear regulator 20 and is used to regulate the current provided from the linear regulator.

From the foregoing it will be recognized that the illustrated power supply 10 can provide the excellent regulation qualities of linear regulators while permitting the "boost" operation that is characteristic of switched regulators. The omission of a complex modulator stage to control the switched regulator and the substitution of a simple linear feedback loop greatly reduces circuit complexity and cost with an attendant increase in reliability. The use of a cascaded linear supply permits over-current protection to be easily implemented.

Figure 3:
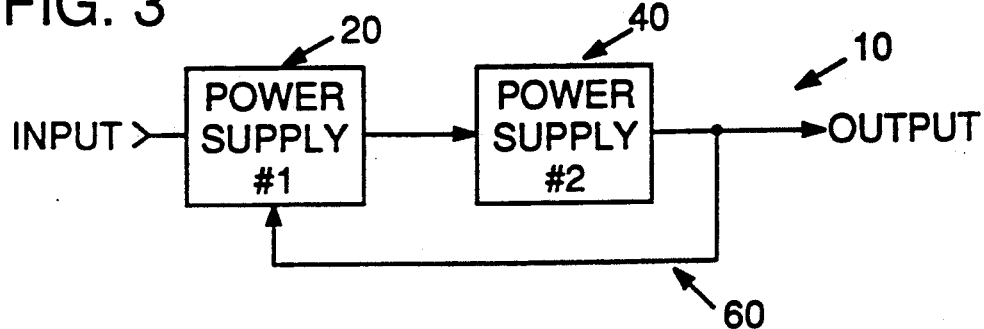
FIG. 3 is a block diagram of a generic hybrid linear-switching power converter according to the present invention.

Having illustrated and described the principles of my invention in a preferred embodiment, it should be apparent to those skilled in the art that the invention can be modified in arrangement and detail without departing from such principles. For example, while the invention has been illustrated with reference to an embodiment in which a switched regulator is cascaded after a linear regulator, it will be recognized that this arrangement may be reversed. FIG. 3 shows a generic form of the invention. In embodiments employing a switched regulator as the first regulator, the output from the linear regulator is used to control the duty cycle (or switching frequency) of the switching regulator.

Similarly, while the invention has been illustrated with reference to a voltage controlled current regulator, it will be recognized that a variety of other linear regulator topologies can alternatively be employed. Likewise, while the invention has been illustrated with reference to one particular switching regulator, it will be recognized that a variety of switching regulator circuits can alternatively be employed.

In view of the wide variety of embodiments to which the principles of my invention may be applied, it should be apparent that the detailed embodiment is illustrative only and should not be taken as limiting the scope of my invention. Rather, I claim as my invention all such modifications as may come within the scope and spirit of the following claims and equivalents thereto.

I claim:

1. A power supply system comprising a switching power supply serially cascaded after a linear power supply;

the linear power supply including a linear regulating device, said linear regulating device presenting a linearly variable impedance through which energy is controllably passed and dissipated as heat to effect regulation;

the switching power supply including a switching element and a reactive element, said elements cooperating to store energy in association with the reactive element during a first part of a switching cycle, and to deliver energy from the reactive element during a second part of the switching cycle;

the linear power supply being connected to a power supply system input;

the switching power supply being cascaded between the linear power supply and a power supply system output;

the system further including a control loop for controlling the linear power supply from a feedback signal derived from the switching power supply output.

2. The system of claim 1 in which the linear regulating device includes a transistor configured as a controlled current source, the magnitude of said controlled current being responsive to the feedback signal.

3. The system of claim 1 in which the switching power supply is an open loop switching power supply.

4. The system of claim 1 in which the duty cycle of the switching power supply is fixed.

5. A hybrid method of providing a regulated output power signal from an unregulated input power signal, the method comprising:

coupling the unregulated input power signal through serially cascaded first and second semiconductor circuits to produce the regulated output signal;

operating the second of said semiconductor circuits non-linearly to switch energy into and out of a reactive element;

operating the first of said semiconductor circuits linearly to present a linearly variable impedance through which energy is controllably dissipated;

deriving a feedback signal from an output signal produced by the second, non-linearly operated semiconductor circuit; and controlling operation of the first, linearly operated semiconductor circuit from said feedback signal.

6. The method of claim 5 which further includes controlling a constant current passed by the linearly operated semiconductor circuit from said feedback signal.

7. A hybrid power supply system comprising:
- a linear power supply for producing a controlled output signal;
- a switching power supply serially cascaded after the linear power supply, the switching power supply having an input coupled to an output of the linear power supply; and
- a control loop for controlling the linear power supply in response to a feedback signal derived from an output of the switching power supply.

8. The system of claim 6 in which the linear power supply provides an output current responsive to the feedback signal.

9. The system of claim 8 in which the linear power supply includes an adjustable voltage regulator.

10. The system of claim 8 in which the switching power supply is open-loop.

11. The system of claim 8 in which the switching regulator has a boost topology.

* * * * *